May 14, 1957   E. M. BUSH   2,792,188
CABLE LAYING AND TIGHTENING DEVICE
Filed April 7, 1954   3 Sheets-Sheet 3

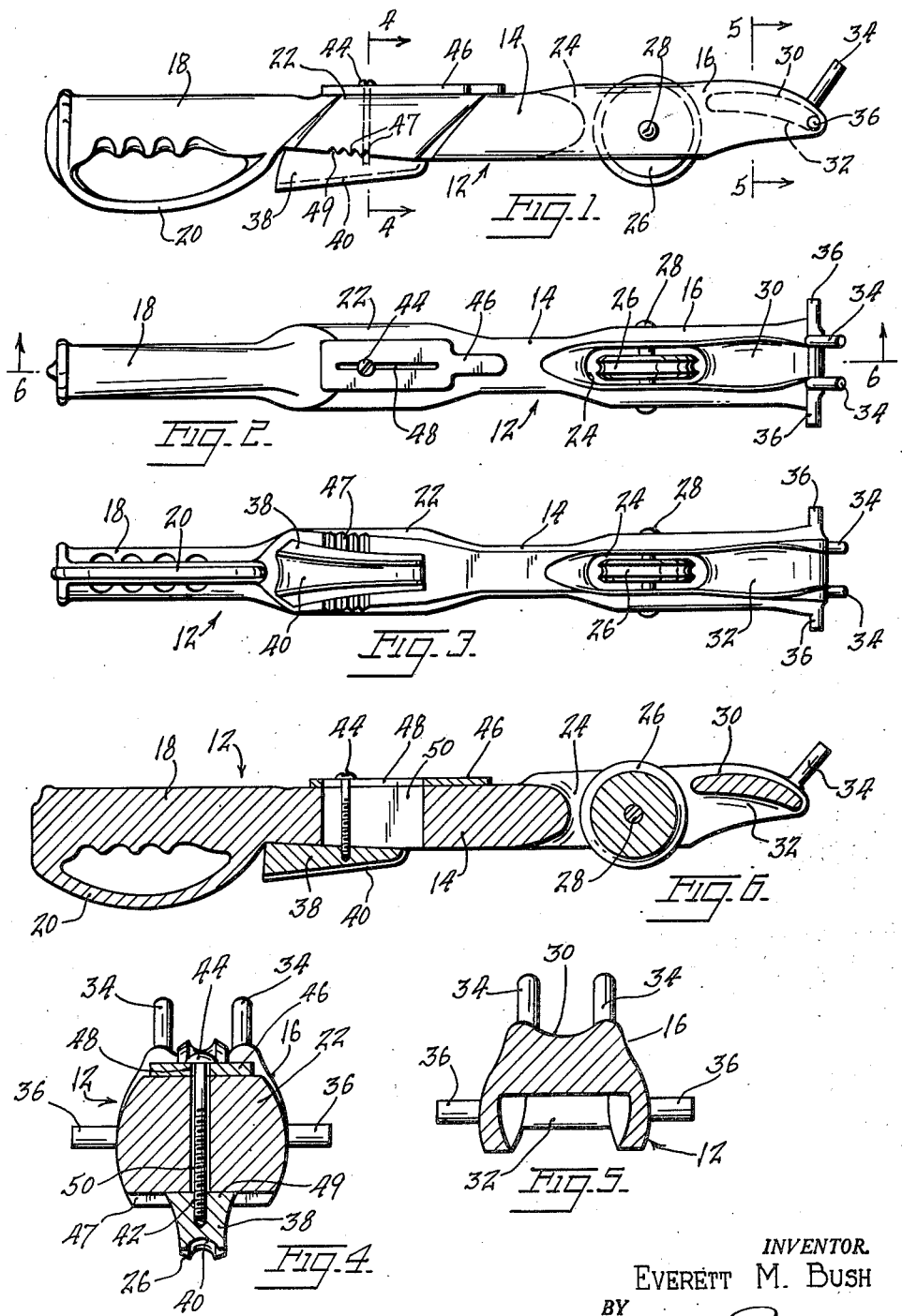

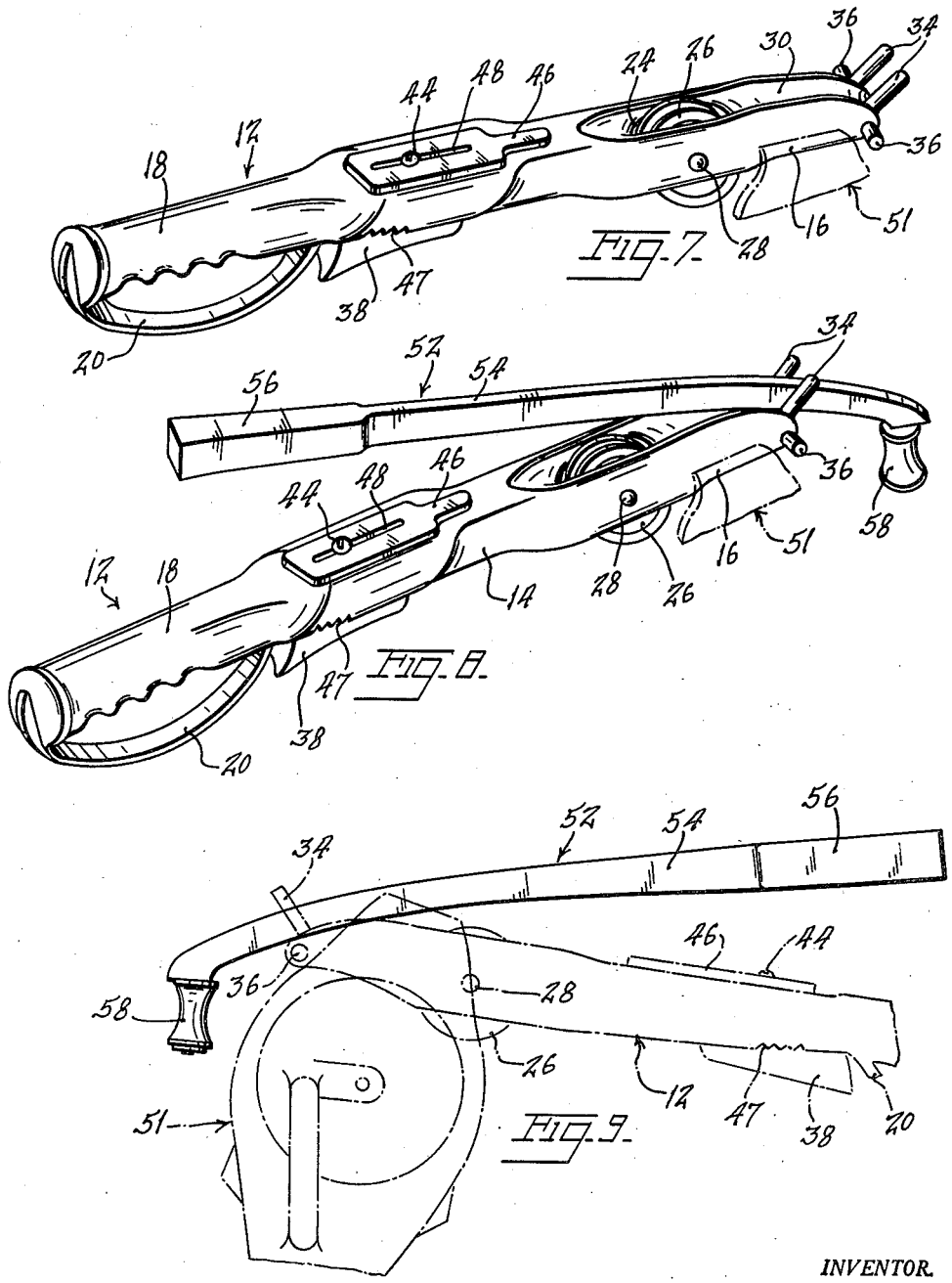

INVENTOR.
EVERETT M. BUSH
BY
ATTORNEY

United States Patent Office 2,792,188
Patented May 14, 1957

2,792,188
CABLE LAYING AND TIGHTENING DEVICE
Everett M. Bush, South Nyack, N. Y.

Application April 7, 1954, Serial No. 421,482

1 Claim. (Cl. 242—157)

This invention relates to a device adapted for use in association with a pulley block or sheave, particularly, a block or sheave of the type mounted on the rear end of a truck for the purpose of leveling a cable on a winch drum.

In operations of the type referred to, it is often difficult to hold the cable in engagement with the pulley of the block or sheave, particularly where the cable is being given a pronounced change in direction at the location of the block. Further, it is necessary at times to eliminate slack in the cable or line in the vicinity of the sheave. Also, a braking action must sometimes be exerted against the pulley and line, when the line is traveling through the block at an excessive speed.

The main object of the present invention is to provide a tool which can be held by a worker in engagement with the pulley block, and readily manipulated for the purpose of leveling the cable, eliminating slack therein, and braking the cable when same is moving at too great a speed.

Another object is to provide a tool as described which will be usable without subjecting the worker to the possibility of injury while the tool is being used.

A further object is to provide, in association with a tool as stated, a kickstick that can be readily manipulated to insure proper rewinding of the cable upon a winch or drum disposed adjacent the pulley block.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a side elevational view of a tool formed in accordance with the invention.

Fig. 2 is a top plan view.

Fig. 3 is a bottom plan view.

Fig. 4 is an enlarged transverse sectional view on line 4—4 of Fig. 1.

Fig. 5 is an enlarged transverse sectional view on line 5—5 of Fig. 1.

Fig. 6 is a longitudinal sectional view on line 6—6 of Fig. 2.

Fig. 7 is a perspective view of the tool wherein a pulley block has been illustrated in operative relation thereto, the pulley block being shown fragmentarily and in dotted outline.

Fig. 8 is a view similar to Fig. 7 wherein a kickstick has been shown in operative relation to the laying and tightening tool.

Fig. 9 is a side elevational view of the kickstick, the pulley block and cable laying tool being shown fragmentarily and in dotted lines.

Figure 10:
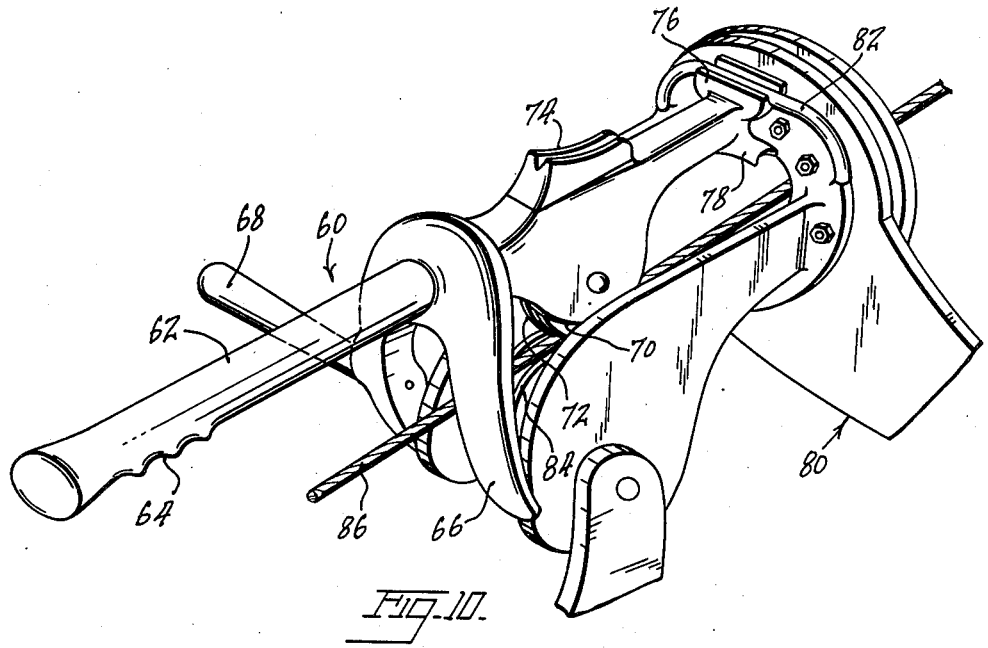
Fig. 10 is a perspective view showing a modified form of the device.

The tool constituting the invention has been generally designated 12, and is formed with an elongated body 14, having a widened front end portion 16 at one end and a handle 18 at its other end provided with a curved guard 20. A widened part 22 is formed in the body adjacent the handle, and spaced forwardly of said widened part is a slot-like opening 24 in which is disposed a pulley 26 rotating on a transversely extending axle 28.

Formed in the top surface of the front end portion is a wide groove 30, the bottom surface of said portion having a groove 32 widening progressively in the direction of the front end of the device, both of said grooves extending to the opening 24. A pair of forwardly inclined cable guide fingers 34 extend upwardly from the walls of the top groove at the front end of the tool, adjacent a pair of laterally and outwardly projecting lugs 36.

Mounted upon the underside of the widened part 22 is an elongated cable guide block 38, having a downwardly opening longitudinal groove 40. The groove 40 is flared at that end thereof remote from the pulley 26, so as to permit the cable to be extended from either side of the tool.

The guide block 38 has a threaded socket 42 formed therein intermediate its ends, and engaged in the socket is a clamp screw 44 extending through an enlargement 46 fixedly mounted on the upper surface of the device. Enlargement 46 has a longitudinal slot 48 formed therein, so as to permit the screw and guide block to be adjusted longitudinally of the body, the body having a slot 50 serving the same purpose as slot 48.

For the purpose of engaging the guide block against movement in each position to which it is adjusted, transverse notches 47 are formed in the underside of the widened part, any of said notches being adapted to receive a transversely extending tooth 49 formed on the upper surface of the guide block. Thus, the guide block clamp screw can be loosened to permit longitudinal adjustment of the guide block and engagement of the tooth in a selected notch, after which the guide block is clamped fixedly in position by tightening of the screw.

In Fig. 7, the device is shown in use, and as seen in this figure, the front end portion can be extended between the upwardly projected wings of a pulley block or sheave 51 such as that shown in U. S. Patent 1,955,942. In this position of the tool, the cable may be extended in one direction, from the pulley of the pulley block, so as to be guided by the pulley 26 into the bottom groove 32, and then out through the front end of the device. Alternatively, the cable can be guided rearwardly, passing through the groove 40 of guide block 38.

If desired, the tool can be used as a braking device, by rocking the same downwardly until the walls of the bottom groove engage against the pulley of the pulley block 51. Further, the tool can be manipulated to left or right or downwardly to a slight extent, to lead the cable in the proper direction and eliminate slack therein.

In Figs. 8 and 9, there is shown a kickstick 52 used with the tool 12. The kickstick is an elongated member 54 having a handle 56 at one end and a spool 58 at its other end. The kickstick can be extended between the guide fingers 34, and manipulated as desired with the spool 58 engaging the line. By rocking the kickstick back and forth in a horizontal plane, it is adapted to guide the cable when the cable is being wound upon or unwound from a winch, not shown, thus to prevent the cable from tangling, and to insure its being wound uniformly upon the winch from side to side of the winch.

Figure 11:
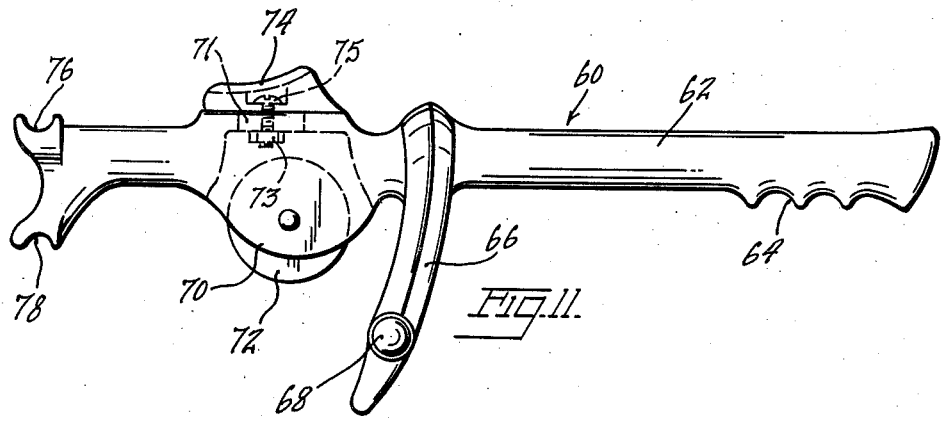
Fig. 11 is a side elevational view of the device illustrated in Fig. 10, parts being omitted.

In Figs. 10 and 11, there is shown a form of the invention wherein the device is modified for use with another type of pulley block. In this instance, the tool has been designated generally at 60 and includes an elongated body 62 having a handle 64 at one end and a cable guide 66 of inverted U-shape intermediate its ends. The cable guide has a laterally projecting side handle 68 to facilitate manipulation of the tool to a desired position.

Forwardly of the guide, the body 62 is formed with a pair of depending, transversely spaced wings 70 between which is rotatably mounted a pulley 72. Above the wings, a longitudinally grooved braking member 74 is adjustably formed upon the body and may be held in position by a suitable clamp screw 75 extending through a slot 71 formed in the body 62. The screw 75 is threaded into a slidable nut plate 73.

At its front end, the upper surface of the body has a transversely extending, grooved, crossbar 76, a downwardly facing, similar crossbar 78 being provided on the underside of the front end of the device.

A sheave of conventional design has been designated generally at 80, and includes a bail or handle 82 of inverted U-shape engageable by the crossbar 76 or 78. A pulley 84, rotatably mounted in the sheave, has a line 86 trained thereagainst, said line being guided by the pulley 72, and guide 66. While the line is being guided, the tool can be rocked upwardly or downwardly about the axis defined by the bight of handle 82, and can also be swung from side to side, due to the looseness of the engagement between said handle and the crossbar 76.

If desired, the tool can be used as a braking device by inverting the same and engaging crossbar 78 with the handle 82, thus to permit the brake member to be swung downwardly into frictional engagement with the line.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:

A cable laying and tightening tool comprising an elongated body having an opening, means thereon to rockably mount the same upon a pulley block, and an idler pulley carried by the body in said opening and adapted to engage a line supplied from said block, the body being formed with longitudinally extending grooves communicating at one end with said pulley-receiving opening, one of said grooves providing a channel for a line guided by the pulley and the other groove having side walls engageable frictionally with the line to exert a braking action thereon, the body including a pair of inclined fingers at opposite sides of the second-named groove to provide means for rockably mounting a kickstick on the body between the fingers.

References Cited in the file of this patent
UNITED STATES PATENTS

| | | |
|---|---|---|
| 730,427 | Wilson et al. | June 9, 1903 |
| 1,293,151 | Madill | Feb. 4, 1919 |
| 1,838,874 | Serres | Dec. 29, 1931 |
| 1,904,890 | Thordarson | Apr. 18, 1933 |
| 2,342,068 | White | Feb. 15, 1944 |
| 2,727,721 | Pinkerton | Dec. 20, 1955 |